US010537858B2

(12) United States Patent
Darling et al.

(10) Patent No.: US 10,537,858 B2
(45) Date of Patent: Jan. 21, 2020

(54) HYDROPHILIC, LIGHT ACTIVE COATING FOR MEMBRANES

(71) Applicant: UCHICAGO ARGONNE, LLC, Chicago, IL (US)

(72) Inventors: Seth B. Darling, Chicago, IL (US); Anna Lee, Darien, IL (US); Jeffrey W. Elam, Elmhurst, IL (US); Joseph A. Libera, Clarendon Hills, IL (US)

(73) Assignee: UChicago Argonne, LLC, Chicago, IL (US)

( * ) Notice: Subject to any disclaimer, the term of this patent is extended or adjusted under 35 U.S.C. 154(b) by 130 days.

(21) Appl. No.: 15/002,102

(22) Filed: Jan. 20, 2016

(65) Prior Publication Data

US 2017/0203258 A1 Jul. 20, 2017

(51) Int. Cl.
*B01D 69/12* (2006.01)
*B01D 67/00* (2006.01)
*B01D 69/02* (2006.01)
*B01D 71/02* (2006.01)
*B01D 71/16* (2006.01)
*B01D 61/02* (2006.01)
*B01D 61/14* (2006.01)
*C02F 1/44* (2006.01)
*C02F 101/30* (2006.01)

(52) U.S. Cl.
CPC ......... *B01D 69/125* (2013.01); *B01D 61/027* (2013.01); *B01D 61/145* (2013.01); *B01D 61/147* (2013.01); *B01D 67/0093* (2013.01); *B01D 69/02* (2013.01); *B01D 69/12* (2013.01); *B01D 71/022* (2013.01); *B01D 71/024* (2013.01); *B01D 71/16* (2013.01); *C02F 1/442* (2013.01); *C02F 1/444* (2013.01); *B01D 2323/02* (2013.01); *B01D 2323/40* (2013.01); *B01D 2323/46* (2013.01); *B01D 2325/10* (2013.01); *B01D 2325/36* (2013.01); *C02F 2101/30* (2013.01); *C02F 2303/20* (2013.01); *C02F 2305/10* (2013.01)

(58) Field of Classification Search
None
See application file for complete search history.

(56) References Cited

PUBLICATIONS

Asahi, et al., Visible-Light Photocatalysis in Nitrogen-Doped Titanium Oxides, www.sciencemag.org Science vol. 293, Jul. 13, 2001, 3 pages.

(Continued)

*Primary Examiner* — Krishnan S Menon
(74) *Attorney, Agent, or Firm* — Foley & Lardner LLP

(57) ABSTRACT

A porous membrane provides enhanced filtration of pollutants and particles by coating the membrane with conformal thin films of doped titanium dioxide via atomic layer deposition or, alternatively, sequential infiltration synthesis. The membrane can either be organic or inorganic, and the doping of the membrane, usually with nitrogen, is an important feature that shifts the optical absorption of the $TiO_2$ from the UV range into the visible-light range. This enables the use of lower energy light, including sunlight, to activate the photocatalytic function of the film. The coating described in the present invention is compatible with virtually any porous membrane and allows for precise tuning of the pore size with molecular precision. The present invention presents a new coating process and chemical structure that provides catalytic activity, strongly enhanced by light, to both mitigate fouling and break down various organic pollutants in the process stream.

7 Claims, 11 Drawing Sheets

(56) References Cited

PUBLICATIONS

Cheng, et al., Effect of nitrogen doping concentration on the properties of TiO2 films grown by atomic layer deposition, Materials Science and Engineering B, vol. 176, Issue 7, Apr. 25, 2011, pp. 596-599.
Moustakas, et al., Visible light active TiO2 photocatalytic filtration membranes with improved permeability and low energy consumption, Catalysis Today, vol. 224, Apr. 1, 2014, pp. 56-69.
Batzill, et al., "Influence of Nitrogen Doping on the Defect Formation and Surface Properties of TiO2 Rutile and Anatase," Physical Review Letters 96, 026103, 4 pages(2006).
Moustakas, et al., "Inorganic-organic core-shell titania nanoparticles for efficient visible light activated photocatalysis," Applied Catalysis B: Environmental 130-131, pp. 14-24 (2013).
Nakano, et al., "Deep-level optical spectroscopy investigation of N-doped TiO2 films," Applied Physics Letters 86, 132104 (2005).
Pore, et al., "Atomic layer deposition of TiO2-xNx thin films for photocatalytic applications," Journal of Photochemistry and Photobiology A: Chemistry 177(1), pp. 68-75 (2006).

HYDROPHILIC, LIGHT ACTIVE COATING FOR MEMBRANES

STATEMENT OF GOVERNMENT RIGHT

The United States Government claims certain rights in this invention pursuant to DE-AC02-06CH11357 between the United States Department of Energy and UChicago Argonne, LLC representing Argonne National Laboratory and also through LDRD 09299-00-153.

TECHNICAL FIELD

The present disclosure relates generally to hydrophilic materials and methods of forming the same.

BACKGROUND

The business for filtration, separation and purification using membranes is currently a 17 billion dollar industry. A variety of mechanisms exist to utilize membranes that are able to filter out hazardous, inorganic, organic and other undesirable particles from a liquid source. However, current porous membranes suffer from low permeability, difficulty removing hazardous organic materials, issues with controlling pore size and a propensity for organic materials to cause degradation of the membrane, commonly referred to as fouling. The current processes of nano-filtration, ultrafiltration, microfiltration and particle filtration fail to overcome these deficiencies in an efficient and cost effective way.

Current processes to fix the shortcomings of porous membranes include applying higher pressure to the process feed, resulting in higher energy costs and increased degradation of the membrane; the introduction of harsh chemical treatments, which result in higher regulatory and material costs as well as an increased risk of health and safety issues; implementation of multi-pass filtration systems, which results in higher costs to purchase the extra filtration materials, increased required space, as well as increased energy costs for each additional pass; and having additional cleaning and maintenance procedures, which results in higher costs for material, labor and time lost in use.

SUMMARY

Embodiments described herein relate generally to hydrophilic, light active coatings and methods for forming such coatings and, in particular, to forming hydrophilic, light active coatings using either a sequential infiltration synthesis (SIS) or atomic layer deposition (ALD) process.

In some embodiments, a method of fabricating a hydrophilic, light active coating includes providing a membrane comprising a base material. The base material is coated with an inorganic material using an atomic layer deposition (ALD) process. The ALD process includes at least one cycle of exposing the membrane to a first metal precursor for a first predetermined time. The first metal precursor binds to the base material. The coating is exposed to a second co-reactant precursor for a second predetermined time. The second co-reactant precursor reacts with the first metal precursor, thereby forming the inorganic material on the base material. This ALD process can be repeated for any number of cycles to deposit the desired thickness of inorganic material film on the base material. The inorganic material is with a hydrophilic material that can be activated by light.

In some embodiments, a hydrophilic coating includes a base material. The coatings penetrate throughout the porous volumes of the substrate and conformally coat available surfaces enabling fabrication of a specific and precise pore size. The resulting membrane is highly hydrophilic and undergoes enhanced catalytic activity when exposed to visible or higher energy light including but not limited to sunlight.

In some embodiments, a method of fabricating a hydrophilic, light active coating includes providing a membrane comprising a base material. The base material is coated with an inorganic material using a sequential infiltration synthesis (SIS) process. The SIS process includes at least one cycle of exposing the membrane to a first metal precursor for a first predetermined time. The first metal precursor infiltrates at least a portion of the base material and binds with the base material. The coating is exposed to a second co-reactant precursor for a second predetermined time. The second co-reactant precursor reacts with the first metal precursor, thereby forming the inorganic material in and on the base material. This SIS process can be repeated for any number of cycles to infuse the base material with the desired loading of inorganic material. The inorganic material infiltrates at least the portion of the base material. The inorganic material is a hydrophilic and photocatalytic material that can be activated by light.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
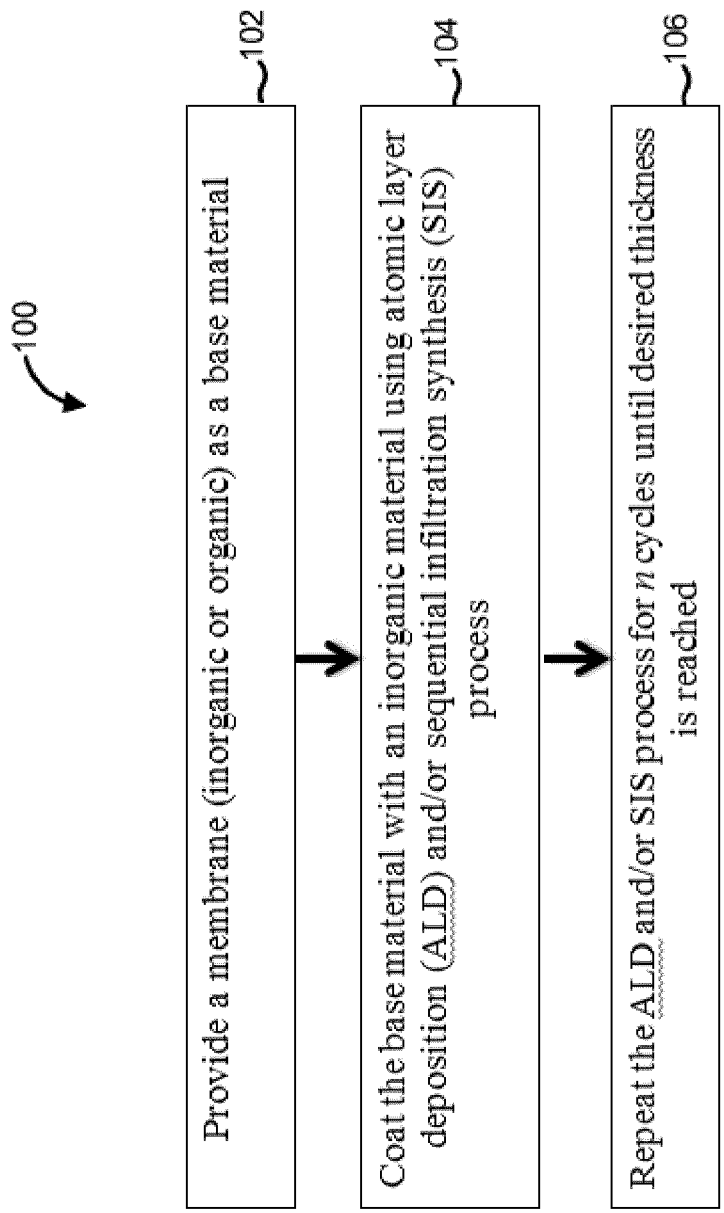
FIG. 1 is a schematic flow diagram for the method of forming a hydrophilic and photocatalytic, light active membrane coating.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to hydrophilic membranes using an atomic layer deposition (ALD) and/or sequential infiltration synthesis (SIS) process for coating.

Water treatment applications of nanofiltration, ultrafiltration, microfiltration, and particle filtration with porous membranes are currently used to remove hazardous and/or undesirable materials from a water source. These membranes have several issues, for example, low permeability, difficulty removing hazardous organic materials, poor control over pore size and a propensity to foul, which is when organic materials cause a degradation in the membrane performance by depositing onto the membrane surface and inhibiting fluid transport. To overcome these issues, current methods include applying higher trans-membrane pressures, introducing harsh chemical treatments, implementation of multiple-pass filtrations, or performing additional cleaning and maintenance. These methods are not cost effective or efficient as they only partially alleviate the shortcomings and result in an increased cost through extra material, labor and regulatory expenditures, protecting against potential health risks, and using more energy with more filtration passes.

In contrast, embodiments of the ALD and SIS coating of a membrane described herein and method of forming the same may provide benefits, for example: (1) rendering the membrane highly hydrophilic, thus lowering the energy required to process water; (2) increasing the water flux through the membrane; (3) decreasing the tendency to foul; (4) compatibility with a wide range of porous membranes; (5) precise tuning of pore size; (6) providing catalytic activity, that is strongly enhanced by visible or higher energy light such as sunlight; (7) breaking down organic pollutants in the process stream.

Atomic layer deposition (ALD) is a chemically diverse vapor-phase deposition technique with the capability to synthesize ultra-thin and pinhole-free films, for example oxide barriers, with well-defined surface chemical control and precise physical thickness. Essentially, ALD is a thin film growth method using alternating, self-limiting reactions between gaseous precursors and a solid surface to deposit materials monolayer-by-monolayer. ALD is unique in that it can allow very high control for deposition of extremely thin layers (e.g., less than 1 nm thick layers) on the substrate. One or more precursors, for example gaseous precursors, are inserted individually and sequentially into the ALD chamber. Each precursor interacts in the ALD chamber to layer-by-layer deposit a film, layering or otherwise coating (e.g., a metal oxide such as $Al_2O_3$ or $TiO_2$) on the substrate positioned in the ALD chamber over numerous insertion cycles. Typical metal oxide ALD processes involve water ($H_2O$) or ozone ($O_3$) as oxygen sources in conjunction with relatively high temperatures (e.g., temperatures greater than 150 degrees Celsius). The ALD process can further include a dopant deposited as part of the cycle.

The properties of doped thin films depend not only on the dopant concentration, but also on the bonding, position and spatial distribution of the dopants, which control the fraction of active dopants, and make up the "doping efficiency". Other thin film growth techniques such as chemical vapor deposition, sputtering or evaporation lack the ability of actively controlling the local environment of the dopant. The saturation coverage controls the amount of dopant per layer and every precursor/co-reactant combination has a given saturation coverage value. This leads to strongly inhomogeneous doping profiles for low dopant concentrations, and often, to allow for more doping control selecting precursors with lower growth rate per cycle, and operating below the saturation coverage at the expense of losing the homogeneity and conformity of ALD.

The sequential infiltration synthesis (SIS) process involves exposing the organic or partially organic base material to various gas phase precursors to synthesize inorganic components in situ. The gas phase precursors are selected for reaction with the base material. Specifically, the gas phase precursor is able to diffuse into the base material. A wide range of precursors are available for selection for SIS modification which are capable of forming inorganic components within a variety of organic materials. Specifically, the SIS process coats the surface of the base material but infiltrates into the bulk base material as well. SIS may be used with polymer materials, wherein the precursor is selectively reactive with only a portion of the polymer materials or one of several materials in a template structure. For example, where the base material is a block copolymer, the precursor may be diffusible through one polymer (for example polystyrene PS) of the block copolymer (for example, PS-b-PMMA) and substantially non-reactive while also be diffusible into the other polymer (such as poly(methyl methacrylate), PMMA) and reacts therewith. SIS can produce solid structures based upon the template material as opposed to hollow structures resultant from mere coating depositions techniques such as traditional ALD.

In one embodiment of the present invention, the SIS process uses a pair of precursors to form the inorganic component where one precursor comprises a metal or metal-containing compound selected to infiltrate into and react with the base material. The second precursor comprises a compound selected to react with the first precursor (or a portion thereof) bound to the surface and within the bulk of the base material. Various metal oxides, metals, and other inorganic materials may also be prepared using ALD, as well as SIS. In particular, the base material can be ceramic, a polymer, a cellulose acetate, a metal, a metal oxide, a metal nitride, a metal sulfide, metal chalcogenide, a metal carbide or a metal phosphide.

The process described herein provides enhanced control of the chemical dopants and finer control of the doping profiles in doped materials, resulting in a hydrophilic, light active coating for membranes.

FIG. 1 is a schematic flow diagram of a method 100 for coating a membrane with conformal $TiO_2$, according to an embodiment. The resulting hydrophilic, light active membrane formed using the method 100 can be used for filtering and removing hazardous and/or undesirable materials from a liquid source.

The method 100 includes providing a membrane comprising a base material at 102. The base material can include any suitable material such as, for example polyethersulfone, polyvinylidene fluoride, polyimides, polyurethane, ceramics, acrylics, polyamides, polyesters, polycarbonates, polyaramides, polytetrafluoroethylene, cellulose acetate, or any other suitable base material which can be used to form the membrane. In some embodiments, the base material is metal oxides, metals, ceramics and other inorganic material that may be coated to form a hydrophilic, light active membrane. For example, the base material can be ceramic, a polymer, a cellulose acetate, a metal, a metal oxide, a metal nitride, a metal sulfide, metal chalcogenide, a metal carbide or a metal phosphide. In particular embodiments, the base material includes $Al_2O_3$, $ZrO_2$, or $TiO_2$ with pores in the 1-5000 nm range.

The base material is coated with an inorganic material using an ALD and/or a SIS process at 104. The ALD and/or SIS process may include exposing the base material to a first metal precursor for a first predetermined time and a first partial pressure of the first metal precursor so that the metal precursor deposits on, coats or infiltrates at least a portion of the base material and binds with the base material. The first metal precursor can be, for example, at least one of a metal alkyl, halide, cyclopentadiene, beta-diketonate, amide, amidinate, alkoxide, or guanidinate.

The first predetermined time can be in the range of 1 seconds to 500 seconds (e.g., 0.01, 0.25, 0.5, 5, 20, 30, 40, 50, 60, 70, 80, 90, 100, 120, 140, 160, 180, 200, 220, 240, 260, 280, 300, 350, 400, 450 or 500 seconds inclusive of all ranges and values there between). In some embodiments, the first predetermined time is in the range of 0.25 and 5 seconds, for example about 0.75 seconds. The first partial pressure of the first metal precursor can be in the range of 0.01 Torr to 10 Torr. (e.g., 0.01, 0.05, 0.1, 0.5, 1.0, 5.0, 10 Torr inclusive of all ranges and values there between). In some embodiments, the first partial pressure of the first metal precursor is in the range of 0.1 Torr and 2 Torr, for example about 1 Torr In some embodiments, the base material can be heated to a predetermined temperature during the ALD and/or SIS process. For example, the first predetermined temperature can be in the range of 80-500 degrees Celsius (e.g., 80, 150, 200, 250, 300, 350, 400, 450, and 500 degrees Celsius inclusive of all ranges and values there between). In some embodiments, the first predetermined temperature can be in the range of the range of 250-450 degrees Celsius, for example 300 degrees Celsius.

In some embodiments, the first metal precursor can include any suitable ligated metal compound, for example metal alkyls, halides, cyclopentadienes, beta-diketonates, amides, amidinates, alkoxides, or guanidinates. In some embodiments, the first metal precursor includes titanium tetrachloride ($TiCl_4$). In order to facilitate the surface reactions at the various temperatures and time intervals, a carrier gas at a certain mass flow rate is used. The carrier gas can be any inert gas, in particular embodiments it is a nitrogen gas. The mass flow rate of the carrier can, for example, be in the range of 150 to 350 sccm (e.g., 150, 200, 250, 300, and 350 sccm inclusive of all ranges and values there between). In some embodiments, the mass flow rate of the nitrogen carrier gas is 200 sccm.

The base material is then exposed to a second co-reactant precursor for a second predetermined time and a second partial pressure of the second co-reactant such that the second co-reactant precursor reacts with the first metal precursor to form the inorganic material on or within the base material. In some embodiments, the second co-reactant precursor includes water, ammonium hydroxide, or any combination thereof. For example, the first metal precursor can be titanium tetrachloride ($TiCl_4$) and the second co-reactant can be water. In some embodiments, the second predetermined time is in the range of 0.01 seconds to 500 seconds (e.g., 0.01, 0.25, 0.5, 5, 20, 30, 40, 50, 60, 70, 80, 90, 100, 120, 140, 160, 180, 200, 220, 240, 260, 280, 300, 350, 400, 450 or 500 seconds inclusive of all ranges and values there between). In some embodiments, the second predetermined time is in the range of 0.25 and 5 seconds, for example about 0.75 seconds. The second partial pressure of the first metal precursor can be in the range of 0.01 Torr to 10 Torr. (e.g., 0.01, 0.05, 0.1, 0.5, 1.0, 5.0, 10 Torr inclusive of all ranges and values there between). In some embodiments, the second partial pressure of the second metal precursor is in the range of 0.1 Torr and 2 Torr, for example about 1 Torr. In some embodiments, the second co-reactant can change between cycles, for example, the first metal precursor can be titanium tetrachloride ($TiCl_4$) and the second co-reactant can be water for the first cycle, and then for the second cycle the second co-reactant can be ammonium hydroxide (($NH_4$)OH). In this manner, the amount of nitrogen in the resulting coating can be controlled.

Any number of cycles 106 of exposing the base material to the first metal precursor and the second co-reactant precursor can be performed to reach a desired thickness of the coating, or a specific porosity. In some embodiments, the number of cycles of the ALD and/or SIS process can be in the range of 1-650, for example 1 cycle, 5 cycles, 10, 50, 100, 200, 350, 400, 450, 500, 550, and 650 cycles inclusive of all ranges and values there between. In some embodiments, 300 to 600 cycles of the ALD (or 1 to 10 cycles of the SIS) process are used to form a desired thickness of the coating in and on the base material.

Expanding further, the ALD and/or SIS process is utilized. In general, the ALD and/or SIS process involves exposing a substrate (e.g., the base material) which can be formed from an organic material to various gas phase precursors (e.g., the first metal precursor and the second co-reactant precursor) to synthesize the inorganic material, which forms the inorganic material on (or near) a surface of the substrate. In some embodiments, the nitrogen-doped base material is formed by alternate exposure to the precursors A and B being individually exposed to the surface, allowing for a sequential layering process to occur. Modes for performing ALD include combinations of multiple different oxidizing/reducing agents that may be used sequentially, simultaneously, and combinations thereof. Each of the different oxidizing/reducing agents or reactants may be selected to facilitate formation or growth of the metal oxide or other metal film during the ALD process.

The oxidizing/reducing agents are selected such that the metal oxide or metal film growth may be inhibited, substantially precluded, or precluded if the ALD process were to be carried out with less than all of the selected oxidizing/reducing agents or if only one the oxidizing/reducing agents was to be utilized in the process. Although various reactants when used alone perform poorly and are characterized by low growth rates of $TiO_2$ or no growth, growth rates may be significantly increased when those same reactants are used in combination with each other in a specific ALD cycle. Accordingly, the oxidizing/reducing reactants, as well as the exposure and purging periods, are selected for their synergistic effect to promote growth and/or formation of the metal containing film when utilized within an ALD cycle.

For example, the base material can be positioned in a reactor with a temperature in the range of 250 degrees Celsius to 450 degrees Celsius to facilitate surface reactions. The base material is exposed to the first precursor (e.g., $TiCl_4$) for the first predetermined time (e.g., for 0.75 seconds) and the first partial pressure (e.g., 1 Torr). The chamber is then evacuated, and/or purged with a first inert gas, for example nitrogen, argon, or any other inert gas before exposing the base material to the second co-reactant component, this purge process lasts for a first predetermined purge time (e.g., 5 seconds). The base material is exposed to the second precursor (e.g., $NH_4OH$) for the second predetermined time (e.g., for 0.25 seconds) and the second partial pressure (e.g., 1 Torr). The chamber is then evacuated, and/or purged with a second inert gas, for example nitrogen, argon, or any other inert gas before exposing the base material to either another cycle or ending the ALD process.

In some embodiments, the second predetermined time varies depending on the desired membrane, for example, to produce nitrogen-doped $TiO_2$ the second predetermined time of exposure to $NH_4OH$ might be 0.25 seconds, whereas the exposure time can be longer, 0.75 seconds, to produce undoped $TiO_2$ using water. The chamber is then again evacuated, and/or purged with an inert gas, for example nitrogen, argon, or any other inert gas before exposing the base material to another cycle of the first and second precursor, this purge process lasts for a second predetermined purge time (e.g., 5 seconds). In another embodiment, the method may include a series of short pulses of the first metal precursor followed by another series of short pulses of the second co-reactant precursor. In some embodiments, a series of short pulses may be combined with long periods of gas phase exposure to the first metal precursor and/or the second co-reactant precursor.

The ALD process results in the growth of the doped or undoped (depending on the second precursor material) inorganic material on the surface of the base material. In some embodiments, the inorganic material can form an inorganic layer that may have a thickness range of 0.2-100 nm, ideally a thickness optimizing light absorption in concert with fluid transport. In some embodiments, the resulting membrane is nitrogen-doped $TiO_2$ and exhibits photocatalytic performance, that has an optical absorption in the visible light range (as the doping shifts the absorption edge from the UV range) thereby enabling the use of lower energy light to activate the photocatalytic function of the coating.

Expanding further upon the SIS process. In general, the SIS process involves exposing a substrate (e.g., the base material) which can be formed from an organic material to various gas phase precursors (e.g., the first metal precursor and the second co-reactant precursor) to synthesize the inorganic material, similar to ALD. However, contrary to ALD which only forms the inorganic material on a surface of the substrate, SIS coats the surface of the substrate but also infiltrates into the bulk substrate. This is achieved by adjusting the partial pressure and time of the gas phase precursor exposures (i.e., the first metal precursor and the second co-reactant precursor).

In some embodiments, the SIS process may include relatively long periods of gas phase exposure and high partial pressure of the first metal precursor and the second co-reactant precursor. For example, the SIS method may include a relatively long period of gas phase exposure and high partial pressure of the first metal precursor followed by a long period of exposure and high partial pressure of the second co-reactant precursor. In various embodiments, a purging step can be performed in-between exposure to the first metal precursor and the second co-reactant precursor.

For example, the base material can be positioned in a hermetically sealed chamber pumped to vacuum. The base material is exposed to the first metal precursor for the first predetermined time (e.g., between 1 second and 500 seconds) and the first partial pressure (e.g., between 0.01 and 10 Torr). The chamber is then evacuated, and/or purged with an inert gas, for example nitrogen, argon, or any other inert gas before exposing the base material to the second co-reactant component. In another embodiment, the method may include a series of short pulses of the first metal precursor followed by another series of short pulses of the second co-reactant precursor. In some embodiments, a series of short pulses may be combined with long periods of gas phase exposure to the first metal precursor and/or the second co-reactant precursor. In some embodiments, the total time of exposure to first metal precursor and/or the second co-reactant precursor during SIS cycle may be 5 to 1000 times higher and the partial pressures may be 5-10,000 larger than the typical time and partial pressure for an ALD cycle.

The first metal precursor infiltrates within the base material and selectively binds (either covalently or non-covalently) to a functional group of the base material, for example a carbonyl group. The second co-reactant precursor is selectively reactive with the first metal precursor that is bound to the base material. For example, the first reactive gas may be a $TiCl_4$ and the second reactive gas may be water or ammonium hydroxide. In some embodiments, a third precursor may be used.

The SIS process results in the growth of the inorganic material on the surface of the base material and also in a sub-surface region of the base material associated with the first metal precursor and the second co-reactant precursor used. In some embodiments, the inorganic material can form an inorganic layer that may have a thickness in the range of 0.2 nm to 5,000 nm. In other embodiments, the inorganic material can infiltrate the base material via SIS so as to infuse the base material polymer with the inorganic material to a depth of 0.05 micron to 1,000 microns. In other embodiments, the resulting polymeric membrane is functionalized with undoped $TiO_2$ to maintain pore morphology and overcome the limitation of polymeric membrane's inability to survive high-temperature processing, while still possessing photocatalytic properties.

Figure 2:
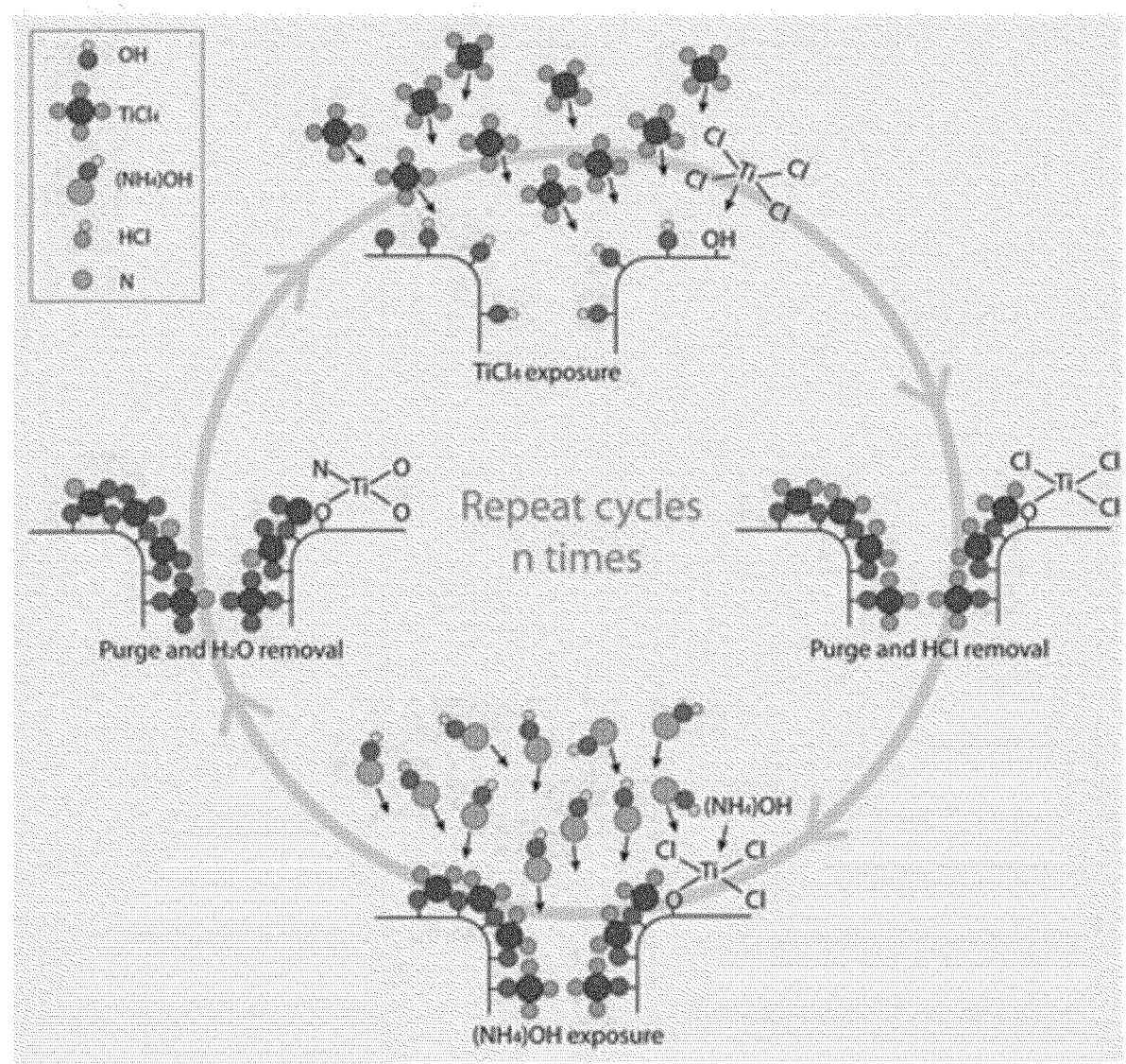
FIG. 2 is a schematic illustration showing the fabrication of the light-active filtration membrane, specifically using nitrogen-doped $TiO_2$ through the ALD process, as seen in FIG. 1.

During the first phase of the ALD or SIS process, the base material, such as $TiO_2$, is exposed to $TiCl_4$ as the first metal precursor which reacts with the oxygen atoms in the $H_2O$. The first phase reaction is facilitated using a nitrogen carrier gas at 330 sccm and a pressure of 1 Torr. Next the reaction chamber is purged resulting in the removal of HCl and $TiCl_3O$ remaining on the base material. During the second phase of the ALD or SIS process, the second co-reactant precursor, $NH_4OH$, is exposed to the surface causing a reaction with the $TiCl_3O$. The reaction is then purged resulting in the removal of $H_2O$ and a deposit of $TiO_2$ and nitrogen remains on the base material. The cycle can repeated for multiple iterations, at various temperatures, and with varying times for pulsing the reactants and purging, to ensure a resulting membrane that has photocatalytic properties as well as being hydrophilic. The chemical reactions for the ALD version of this process are shown in FIG. 2.

Figure 3A:
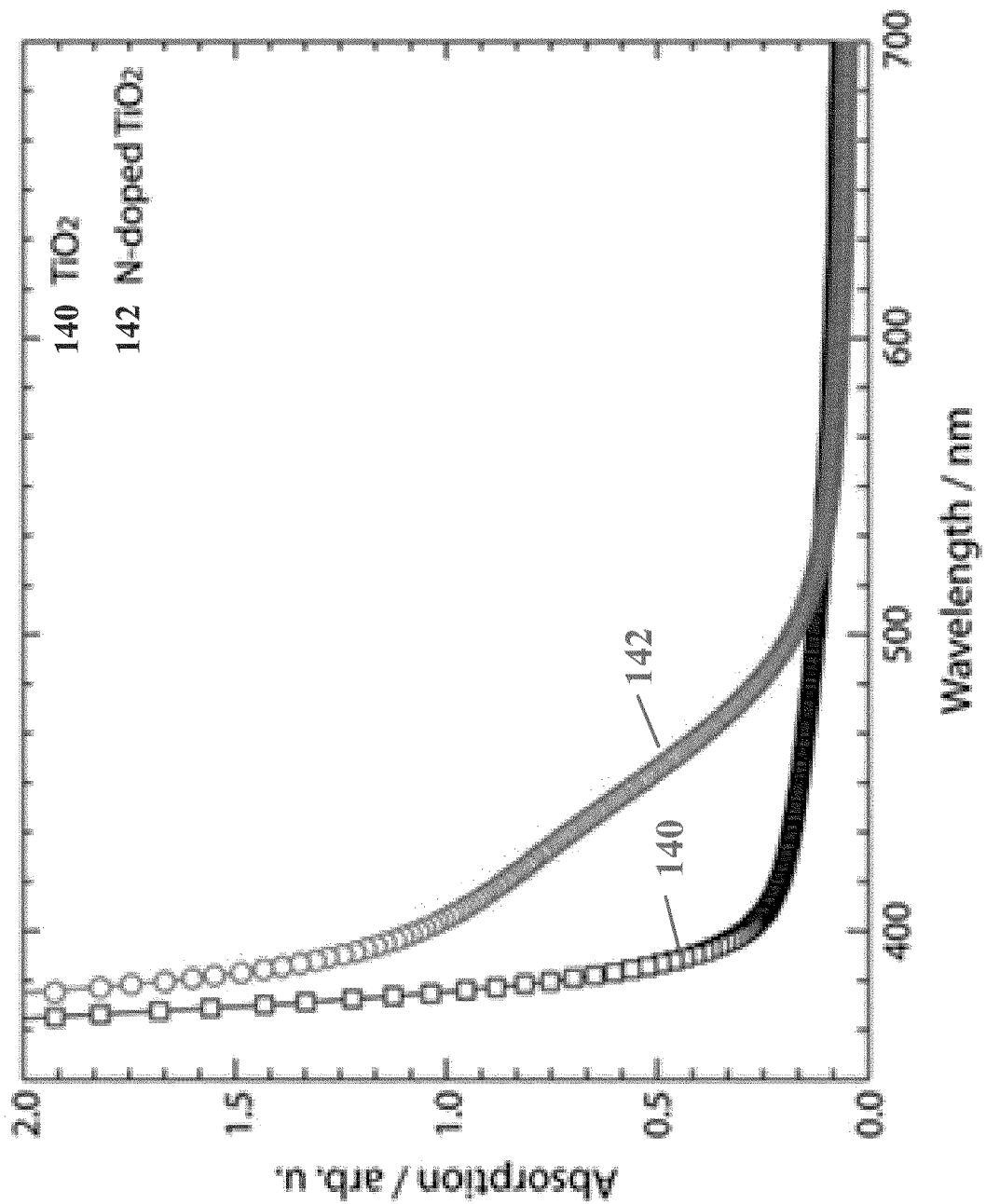
FIG. 3A is a graphical representation of the wavelength absorption spectra of $TiO_2$ and nitrogen-doped $TiO_2$.
Figure 3B:
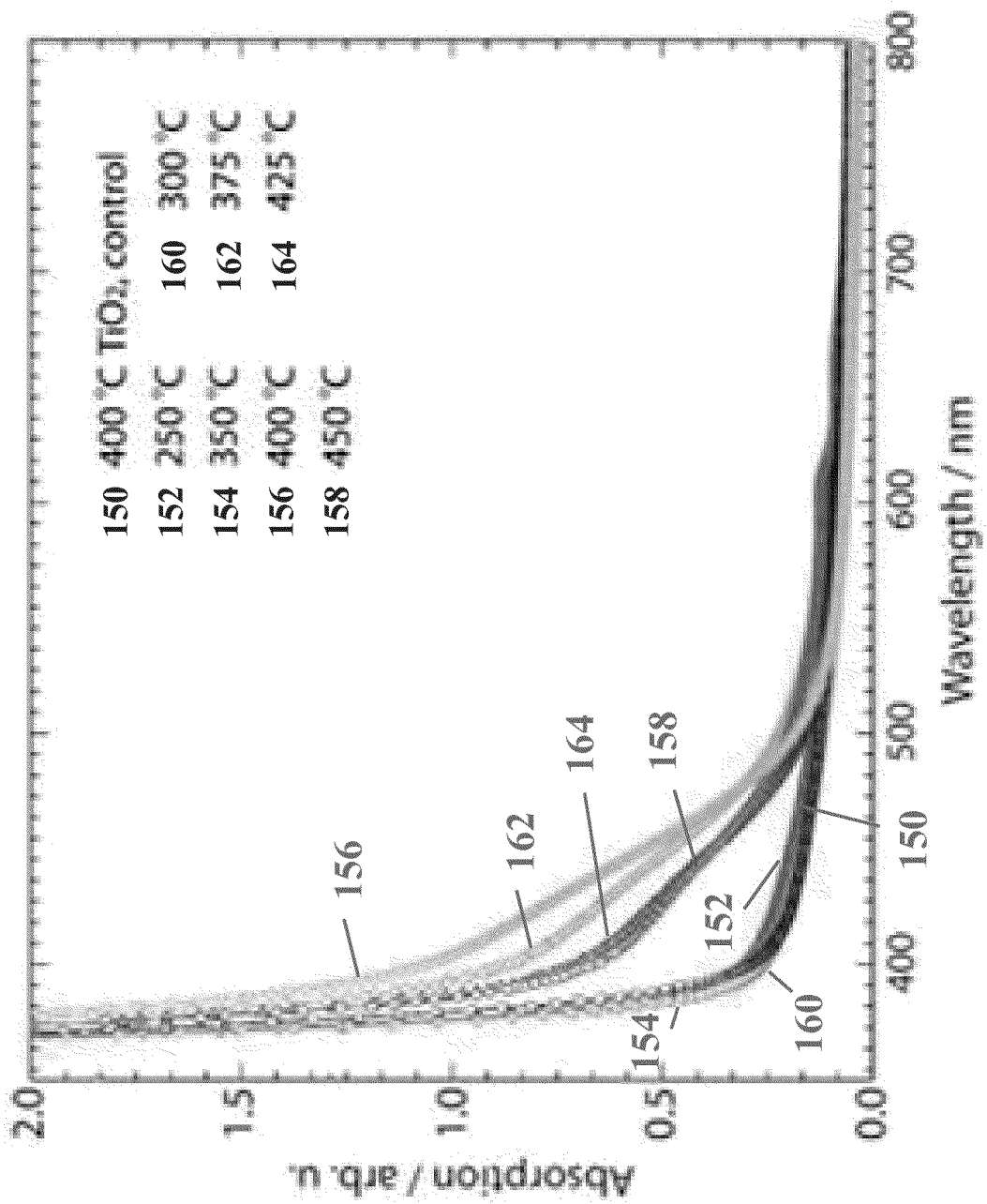
FIG. 3B is a graphical representation of the wavelength absorption spectra of $TiO_2$ prepared by ALD at a deposition temperature of 400 degrees Celsius and nitrogen-doped $TiO_2$ at various deposition temperatures from 250-450 degrees Celsius.

In this manner, a coated membrane having high hydrophilicity and photocatalytic performance for the spectrum of visible light is formed. FIG. 3A is a graphical representation of the wavelength absorption spectra of $TiO_2$ 140 and nitrogen-doped $TiO_2$ 142. The nitrogen-doped $TiO_2$ outperformed the $TiO_2$ between the wavelengths of 380-500 nm. FIG. 3B is a graphical representation of the wavelength absorption spectra of $TiO_2$ formed at 400 degrees Celsius and nitrogen-doped $TiO_2$ at various deposition temperatures from 250-425 degrees Celsius. The fabrication of nitrogen-doped $TiO_2$ is temperature dependent, with greater temperatures during doping resulting in higher nitrogen doping concentrations and consequently membranes with higher light absorption for similar wavelengths in comparison to the lower temperature ones, up to a certain maximum temperature after which performance decreases.

Figure 4A:
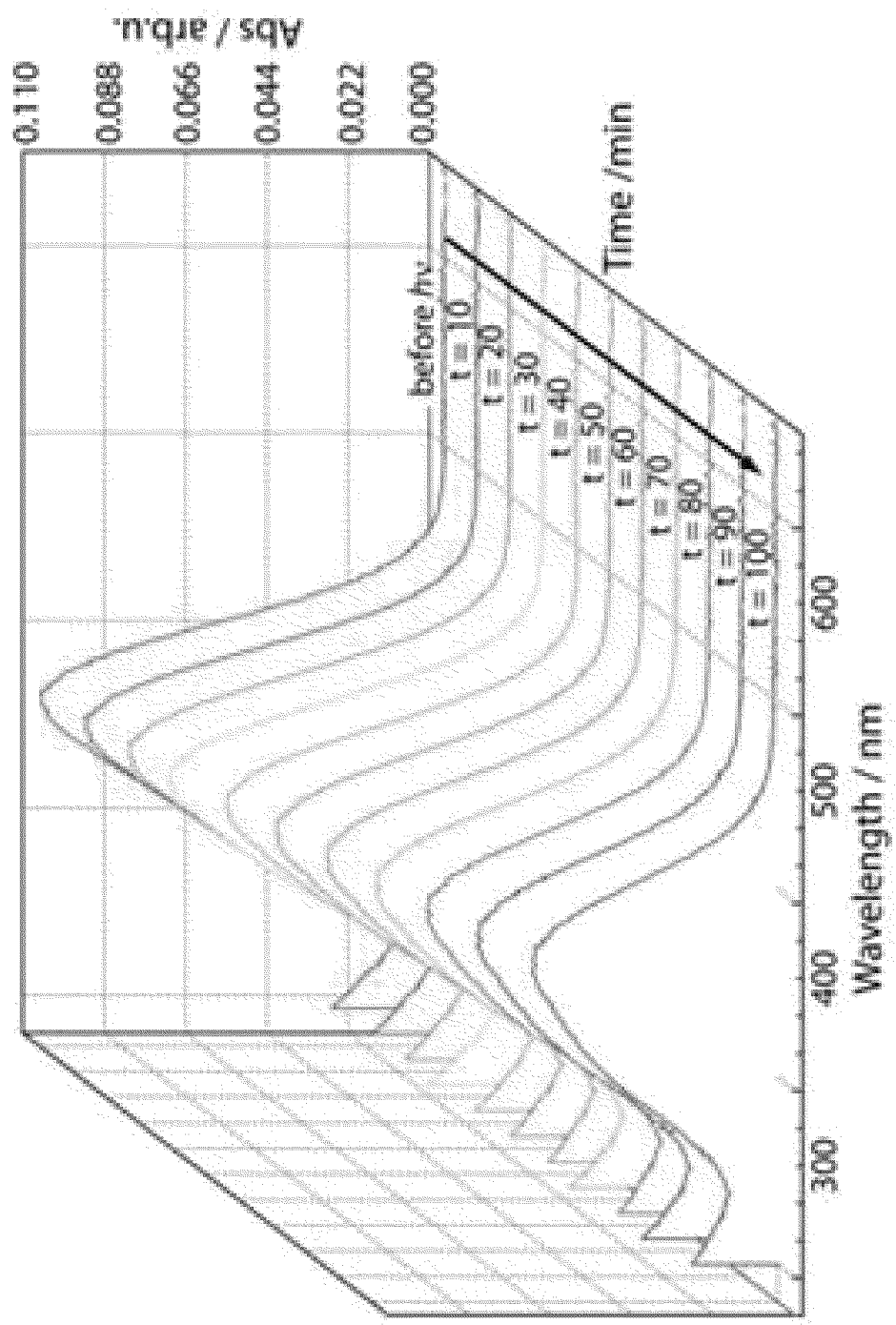
FIG. 4A is a graphical representation of the absorption spectra as a function of wavelength and time for the present invention degrading a model organic dye (methyl orange) under simulated one sun illumination conditions (100 mW/cm$^2$).

FIG. 4A is a graphical representation of the absorption spectrum of a solution containing a model organic dye as a function of wavelength and time for the present invention under simulated sunlight. The graph is a representation of the photodegradation of a pollutant, under one sun condition (100 mW/cm$^2$). The pollutant that was degraded was 4 mg/L of methyl orange which has chemical structure of:

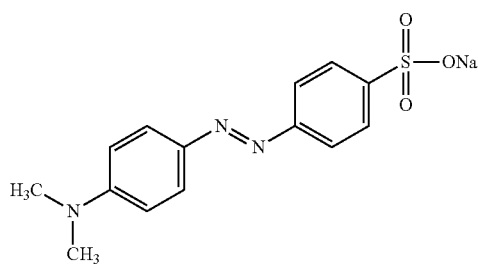

Figure 4B:
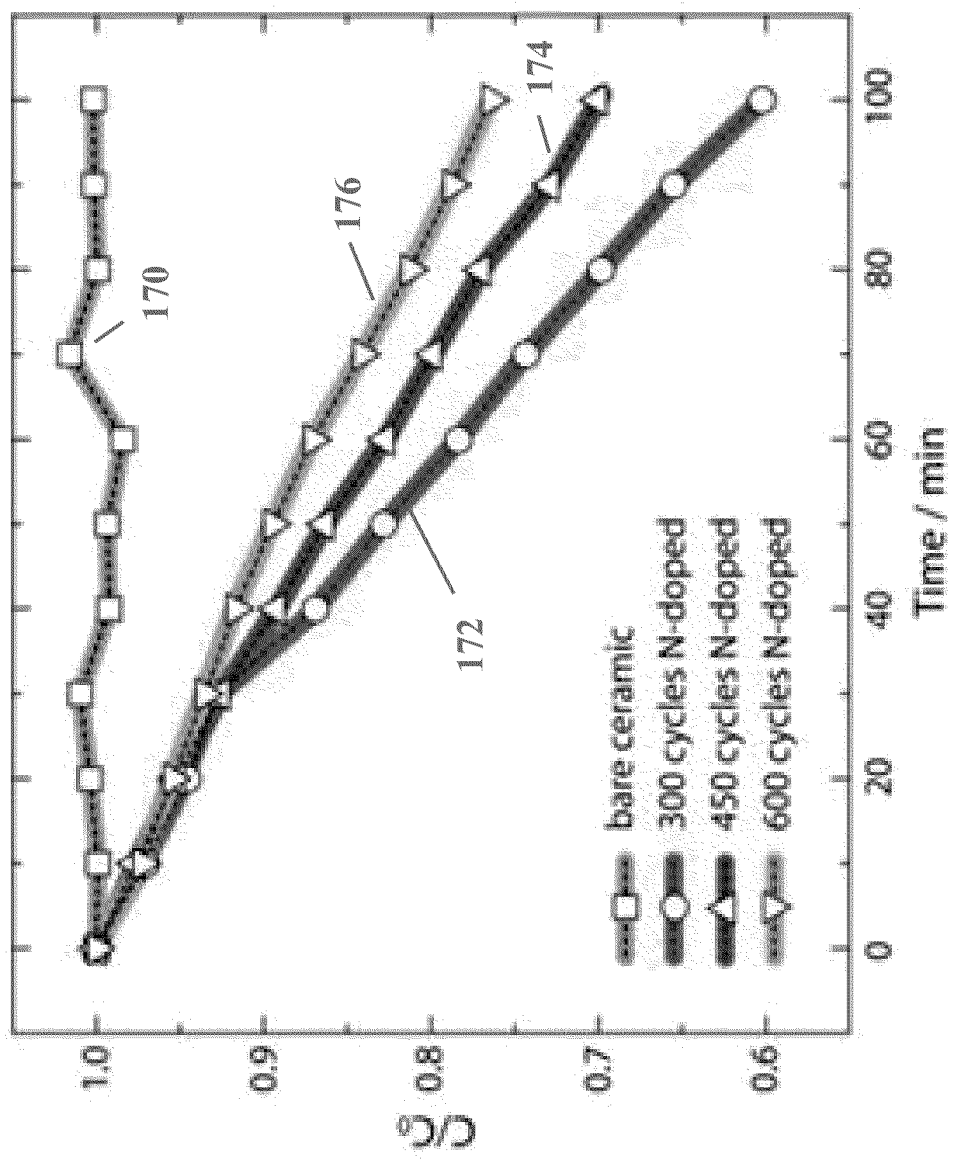
FIG. 4B is a graphical representation of the results of the initial dye concentration on the photocatalytic degradation of methyl orange using nitrogen-doped $TiO_2$ membranes. A control of the bare ceramic ($ZrO_2/TiO_2$) was used. The absorption peak at 464 nm for these data points was used.

FIG. 4B is a graphical representation of the results of the photocatalytic degradation of methyl orange using nitrogen-doped $TiO_2$ membranes having different thickness coatings. A control of bare ceramic ($ZrO_2/TiO_2$) was used to compare results of nitrogen-doped $TiO_2$ that had been through 300 cycles, 450 cycles and 600 cycles of the ALD process described herein. The results show that 300 cycles of the ALD process was preferable to processes that involved more cycles, as the more cycles performed resulted in a degradation of membrane performance most likely due to decreased fluid flow through the narrower pores. Membranes with different initial pore sizes would behave differently for the same number of ALD cycles. The absorption peak from FIG. 4A, the wavelength of 464 nm, was used to characterize the methyl orange concentration and attain the results in FIG. 4B.

Figure 5:
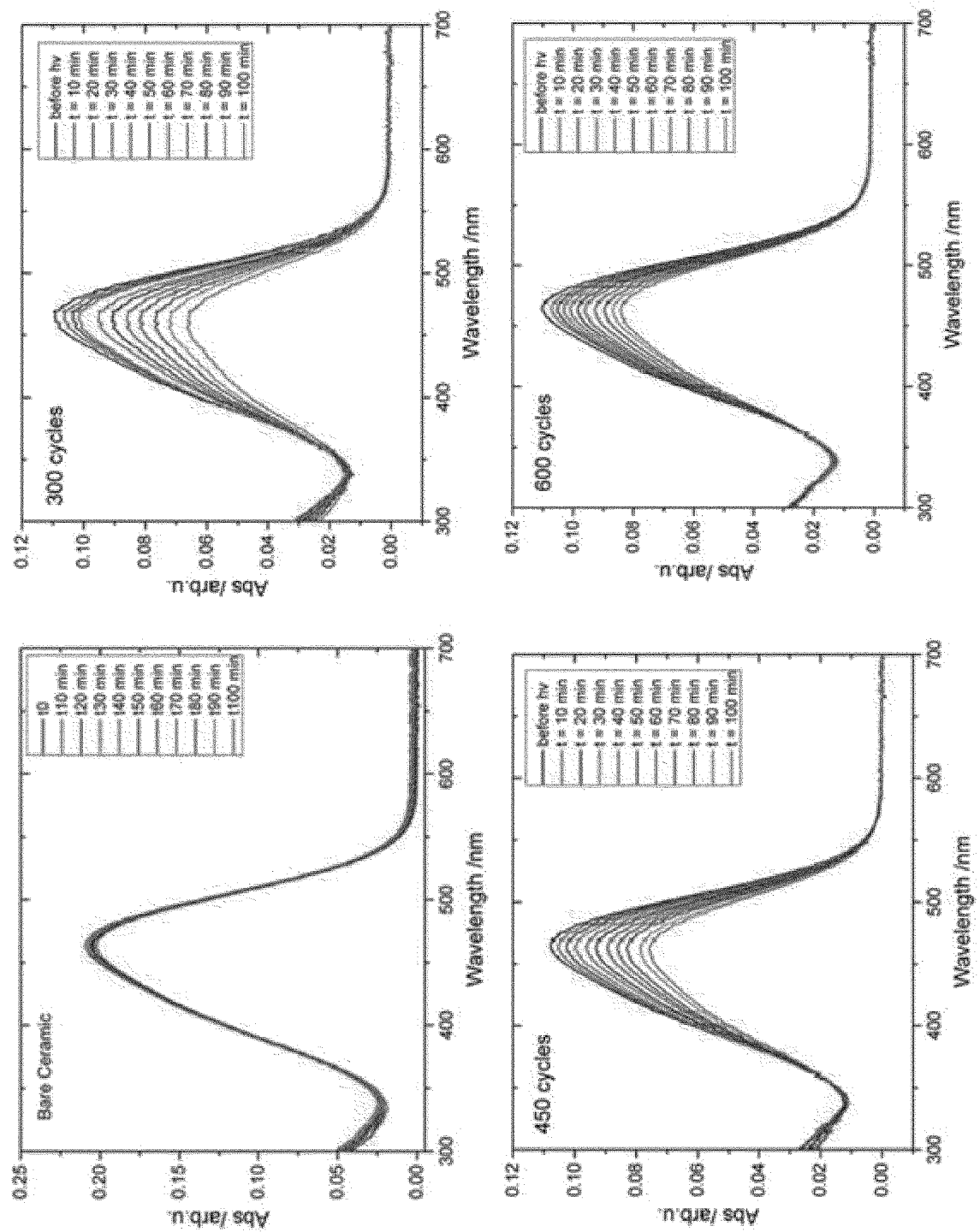
FIG. 5 is graphical representations of the absorption spectra of methyl orange solutions for different membranes as a function of time under simulated solar light.

FIG. 5 is graphical representations of the absorption spectra of methyl orange solutions after exposure to a membrane under simulated sunlight for a control membrane and nitrogen-doped $TiO_2$ membranes formed through 300, 450, and 600 ALD cycles. The outermost line represents the control material, with each subsequent inner line representing 10 more minutes of exposure, with 100 minutes being the innermost line. The results for the control, 300, 450, and 600 membranes, a, b, c, and d, respectively, show that degradation activities are directly related to the time over which they are under the simulated sunlight conditions, with greater degradation performance with increasing time in each of the membranes. The results also confirm that which was seen in FIG. 4B, that the 300 cycle ALD process has the best dye degradation performance under simulated sunlight for this particular base membrane. Additionally, membranes with different pore size distributions would likely have different results.

Figure 6:
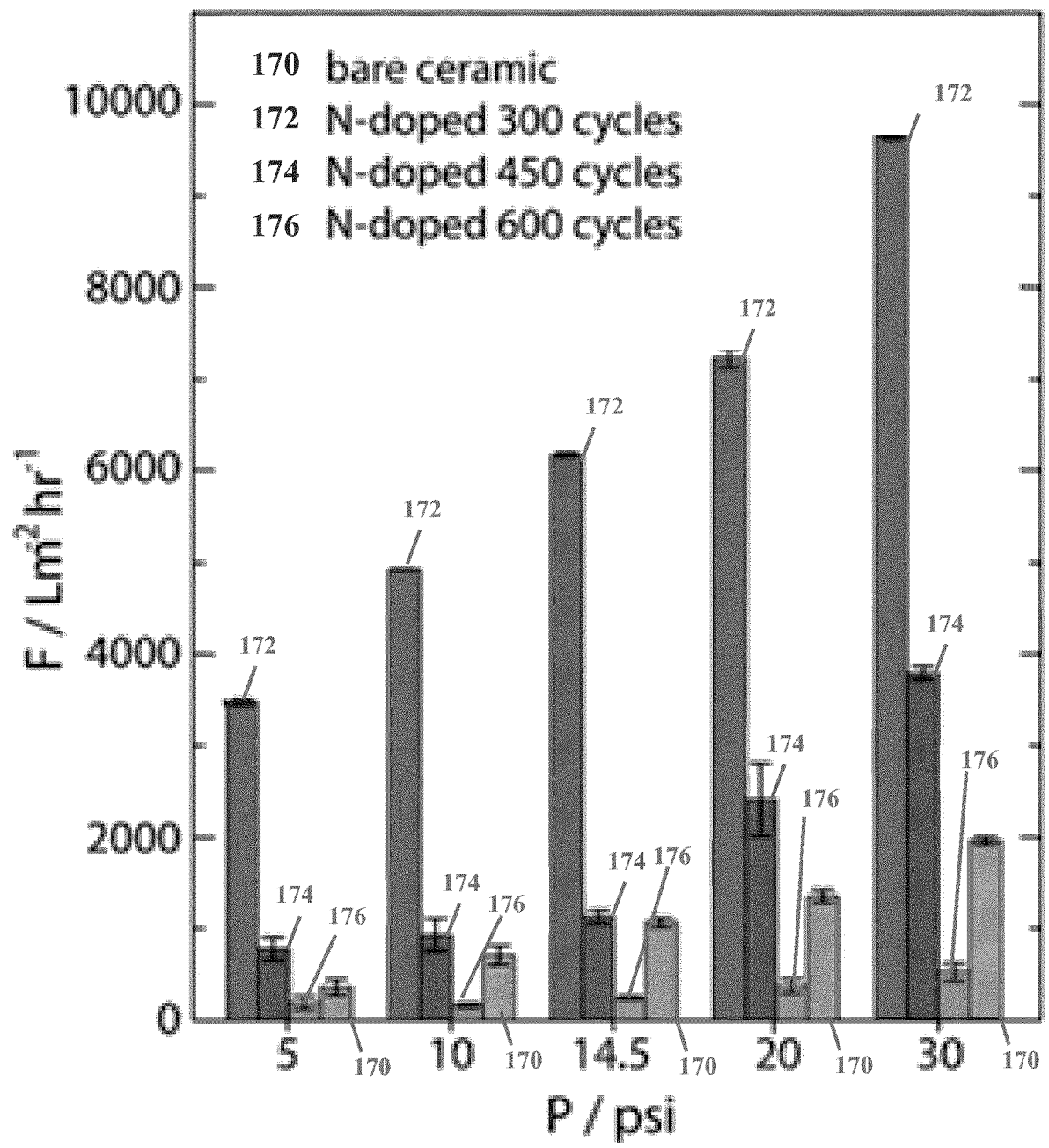
FIG. 6 is a graphical representation of the resulting flux performance for pure water at various applied inlet pressures for different nitrogen-doped membranes with varying ALD cycles and bare ceramic.

FIG. 6 is a graphical representation of the resulting flux performance (F/Lm$^{-2}$ hr$^{-1}$) at various applied pressures for different nitrogen-doped membranes with different ALD cycles (300, 450, and 600) and bare ceramic as a control. Each resulting bar graph has an error bar that represents the three filtration runs applied at each pressure for the membrane. The results show that 300 cycles of the ALD process to from the nitrogen-doped $TiO_2$ is the preferred cycle number in regards to flow rate for the range of coating thicknesses studied, as it has a flow rate three times greater than 450 cycle ALD process and over six times in comparison to the bare ceramic. Additionally, the 450 cycle nitrogen-doped $TiO_2$ has a flux performance similar to the bare ceramic, with the 600 cycle nitrogen-doped $TiO_2$ having an inferior flux performance compared to the bare ceramic. This result is due to the additional layer thickness generated by the additional number of ALD layering cycles performed, which limits the ability of the water to flow through the membrane.

Figure 7:
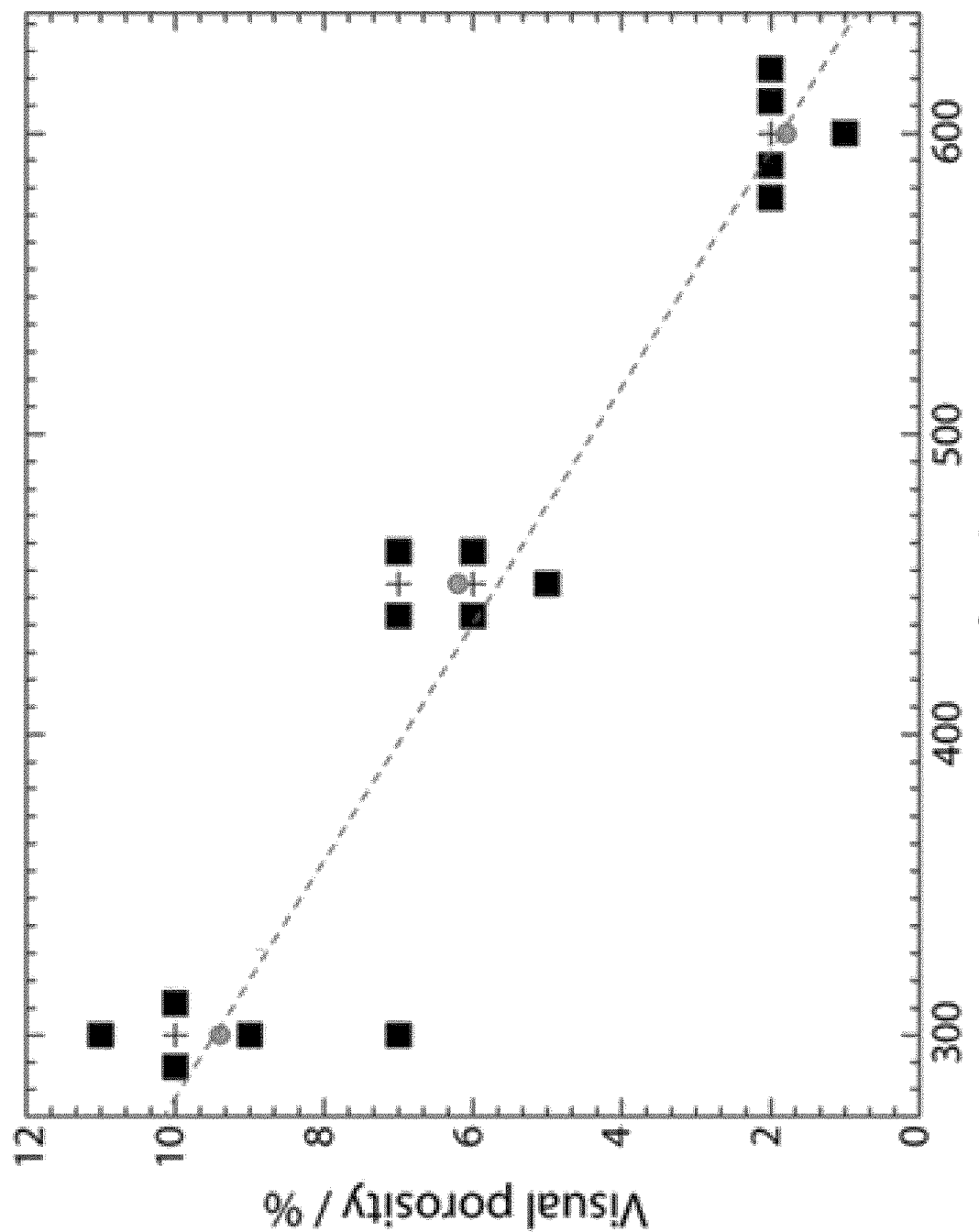
FIG. 7 is a graphical representation of the resulting surface visual porosity of the nitrogen-doped $TiO_2$ as a function of the number of ALD cycles performed on the membrane. The squares represent measurements from different regions on a given sample.

FIG. 7 is a graphical representation of the resulting surface visual porosity of the nitrogen-doped $TiO_2$ as a function of the number of ALD cycles performed on the membrane. Five measurements were taken with a scanning electron microscope (SEM) to determine the percentage of visual porosity in the membrane and to generate a linear fit line. The results show a declining visual porosity % as the number of ALD cycles increase. The black dots represent each measurement, with a plus sign linking similar but separate measurements, whereas the red circles represent the average of the five measurements of surface visual porosity for the 300, 450, and 600 cycle nitrogen-doped $TiO_2$. The average for the 300, 450, and 600 cycles were 9.4%, 6.2% and 1.8% respectively.

EXAMPLES

Figure 8C:
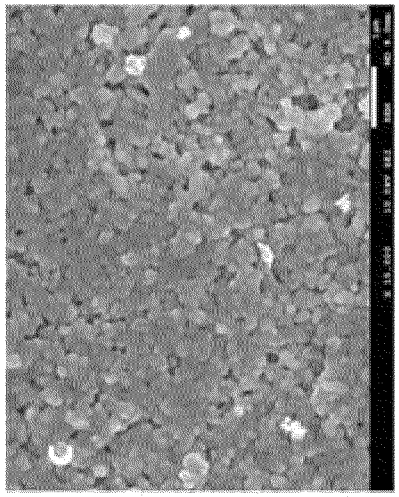
FIG. 8A-C is a top down view of an SEM micrograph of an image of the nitrogen-doped $TiO_2$ membranes formed by 300, 450, and 600 ALD cycles respectively.
Figure 8B:
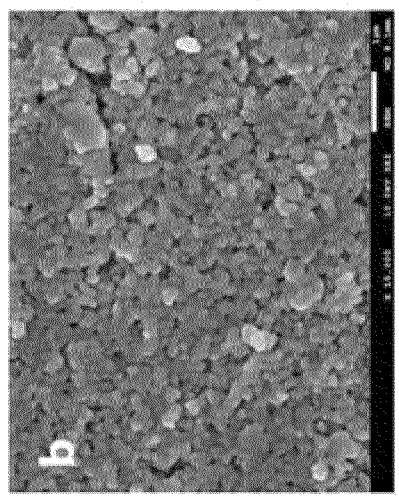
Figure 8A:
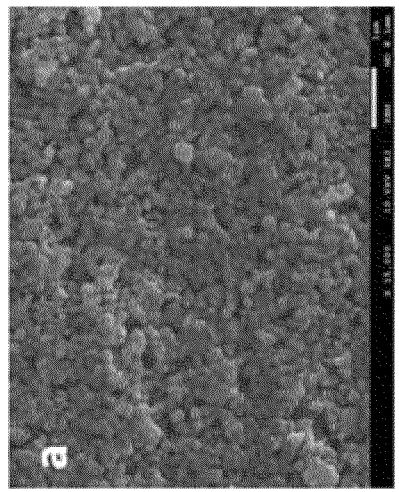
Figure 8F:
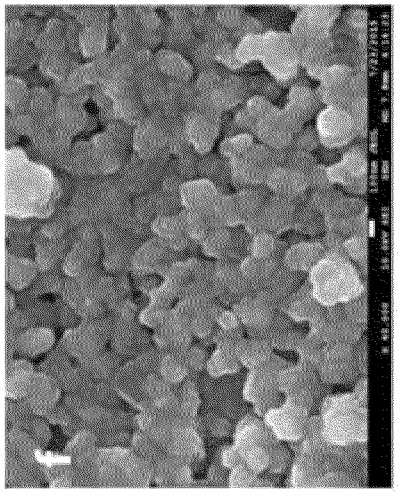
FIG. 8D-F is the same top down view of an SEM micrograph of an image in FIG. 8A-C at a higher magnification.
Figure 8E:
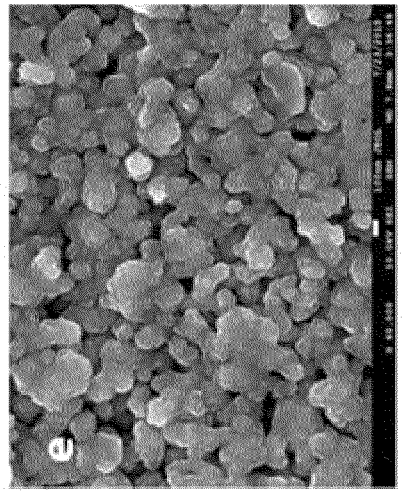
Figure 8D:
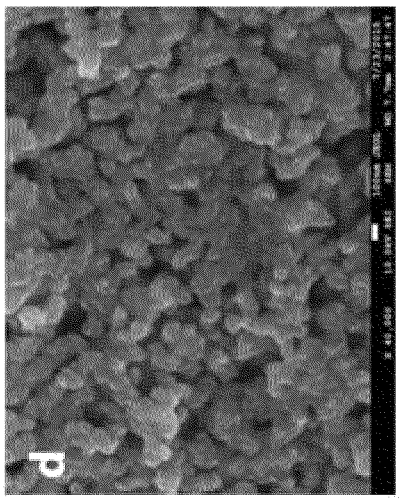

FIG. 8A-C is a top down view, SEM micrograph of the nitrogen-doped $TiO_2$ membranes formed by 300, 450, and 600 ALD cycles, respectively. Each membrane is nitrogen-doped $TiO_2$ formed through the ALD process with exposure to $TiCl_4/NH_4OH$ and $TiCl_4/H_2O$, with reactions being performed 400 degrees Celsius. FIG. 8D-F is a top down view SEM micrograph of the nitrogen-doped $TiO_2$ membranes formed by 300, 450, and 600 cycles, respectively, at a higher magnification.

Figure 9A:
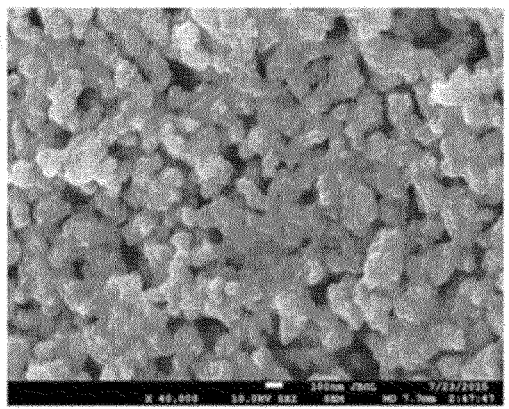
FIG. 9A-C is a surface view of a SEM image of nitrogen-doped $TiO_2$ produced from a 300, 450, and 600 cycles, respectively, of the ALD process in order to determine surface porosity.
Figure 9A:
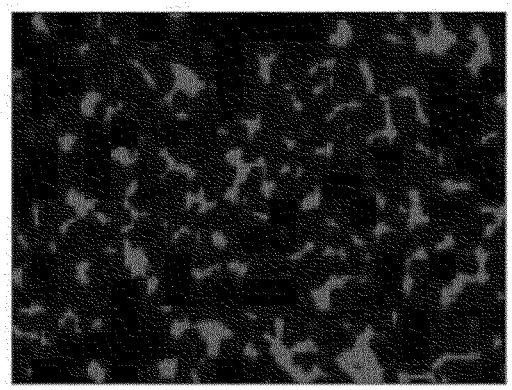
Figure 9B:
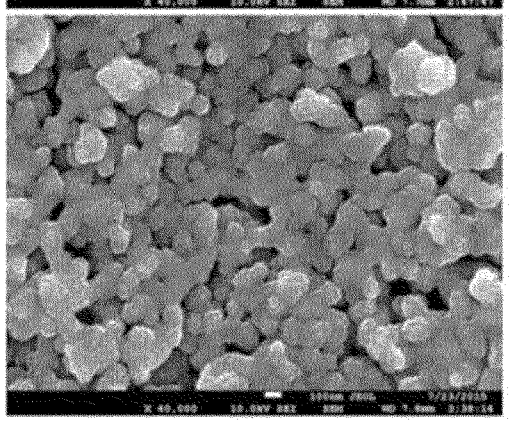
Figure 9B:
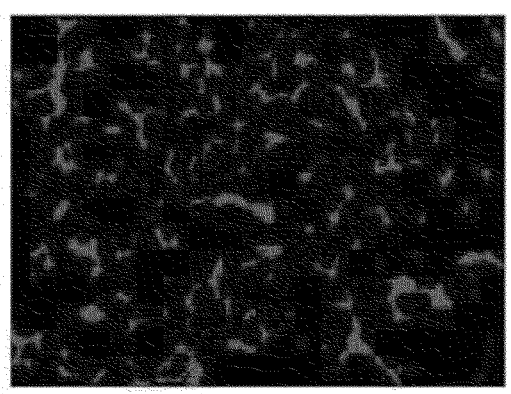
Figure 9C:
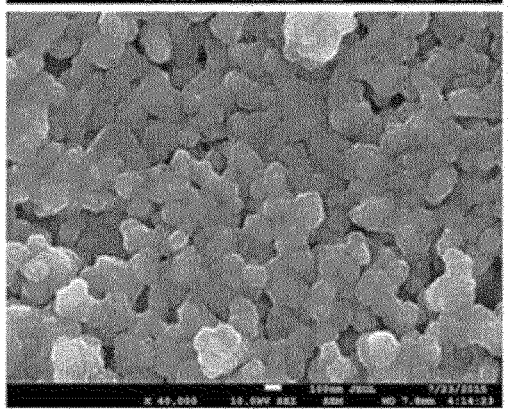
Figure 9C:
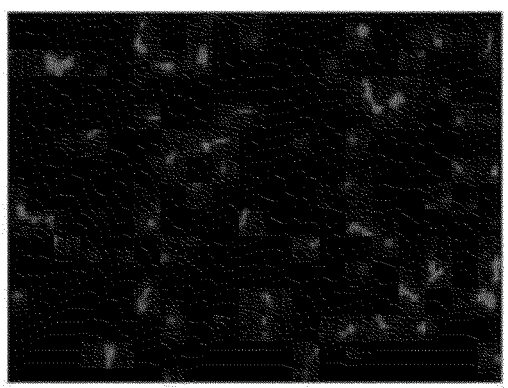

FIG. 9A is a surface view, SEM image of nitrogen-doped $TiO_2$ membrane produced from a 300 cycles ALD process with a resulting surface porosity of 10%. FIG. 9B is a surface view SEM image of nitrogen-doped $TiO_2$ produced from a 450 cycles ALD process with a resulting surface porosity of 6%. FIG. 9C is a surface view SEM image of nitrogen-doped $TiO_2$ produced from a 600 cycles ALD process with a resulting surface porosity of 2%.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the term "about" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present disclosure.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the disclosure have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of fabricating a hydrophilic, light active membrane, comprising;
   providing a membrane comprising a base material;
   loading the membrane into a chamber;
   coating the base material with an inorganic material coating comprising using a deposition method selected from the group consisting of atomic layer deposition (ALD) process or sequential infiltration synthesis (SIS) process, with the at least one of the ALD process or SIS process including a supercycle of:
   deposition of undoped $TiO_2$ layer by a one or more undoped deposition cycle of:
      exposing the membrane to a first titanium precursor for a first predetermined time and a first partial pressure, the first titanium precursor depositing on or infiltrating at least a portion of the base material and binding with the base material,
      purging the chamber using a first inert gas and for a first purge time,
      exposing the membrane to a second co-reactant precursor for a second predetermined time and a second partial pressure, the second co-reactant precursor reacting with the bound first titanium precursor, thereby forming the undoped $TiO_2$ on the base material, the inorganic material growing on or infiltrating at least the portion of the base material, and
      purging the chamber using a second inert gas and for a second purge time;
   deposition of doped $TiO_2$ layer by a one or more doped deposition cycle of:
      exposing the membrane to a second titanium precursor for a third predetermined time and a third partial pressure, the second titanium precursor depositing on or infiltrating at least a portion of the base material and binding with the base material,
      purging the chamber using a third inert gas and for a third purge time,
      exposing the membrane to a $NH_4OH$ for a fourth predetermined time and a fourth partial pressure, the $NH_4OH$ reacting with the second titanium precursor, thereby forming the doped $TiO_2$, and
      purging the chamber using a fourth inert gas and for a fourth purge time wherein the supercycle is repeated forming the inorganic coating having alternating layers of undoped $TiO_2$ and doped $TiO_2$.

2. The method of claim 1, wherein the base material includes at least one of a ceramic, a metal, a metal oxide, a metal nitride, a metal sulfide, metal chalcogenide, a metal carbide or a metal phosphide.

3. The method of claim 1, wherein the first predetermined time is 0.75 seconds and the second predetermined time is 0.25 seconds.

4. The method of claim 1, wherein the second titanium precursor is $TiCl_4$.

5. The method of claim 1, wherein the first titanium precursor is the same as the second titanium precursor.

6. The method of claim 1, wherein the number of deposition cycles of the ALD process is between 300 and 600 cycles.

7. The method of claim 1, wherein the number of deposition cycles of the SIS process is between 1 and 10 cycles.

\* \* \* \* \*